United States Patent [19]

Lindsey, Jr.

[11] E Patent Number: Re. 31,881

[45] Reissued Date of Patent: May 14, 1985

[54] SETTING TOOLS AND LINER HANGER ASSEMBLY

[75] Inventor: Hiram E. Lindsey, Jr., Midland, Tex.

[73] Assignee: MWL Tool and Supply Company, Midland, Tex.

[21] Appl. No.: 529,757

[22] Filed: Sep. 6, 1983

Related U.S. Patent Documents

Reissue of:

[64] Patent No.: 4,287,949
Issued: Sep. 8, 1981
Appl. No.: 109,979
Filed: Jan. 7, 1980

[51] Int. Cl.[3] ..... E21B 23/04

[52] U.S. Cl. ..... 166/212; 166/208; 166/215

[58] Field of Search ..... 166/211, 212, 214, 215, 166/208, 217, 123, 125, 136, 137

[56] References Cited

U.S. PATENT DOCUMENTS

| | | | |
|---|---|---|---|
| 2,174,076 | 9/1939 | Bowen | 285/144 X |
| 2,877,850 | 3/1959 | Burns | 166/208 X |
| 3,152,643 | 10/1964 | Burns | 166/208 X |
| 3,171,491 | 3/1965 | States | 166/208 X |
| 3,420,308 | 1/1969 | Putch | 166/208 |
| 3,608,634 | 9/1971 | Cochran | 166/208 |
| 3,677,341 | 7/1972 | Burns et al. | 166/208 |
| 3,920,075 | 11/1975 | Braddick et al. | 166/290 |
| 3,934,652 | 1/1976 | Cochran | 166/208 X |
| 4,281,711 | 8/1981 | Braddick et al. | 166/118 |

*Primary Examiner*—Stephen J. Novosad

[57] ABSTRACT

A liner hanger and setting tool for use in oil well completions employing a liner hanger having a one piece body member and spring biased slips and a setting tool having a hydraulically actuated slip release mechanism normally retaining the slips in a retracted position and operable upon application of fluid pressure for releasing such slips. The setting tool has a retrievable pack-off bushing disposed in the bore of the liner hanger and a threaded nut type of release for disconnecting the setting tool from the liner hanger. The setting tool requires pressure for setting and rotation for release.

15 Claims, 15 Drawing Figures

FIG. 5
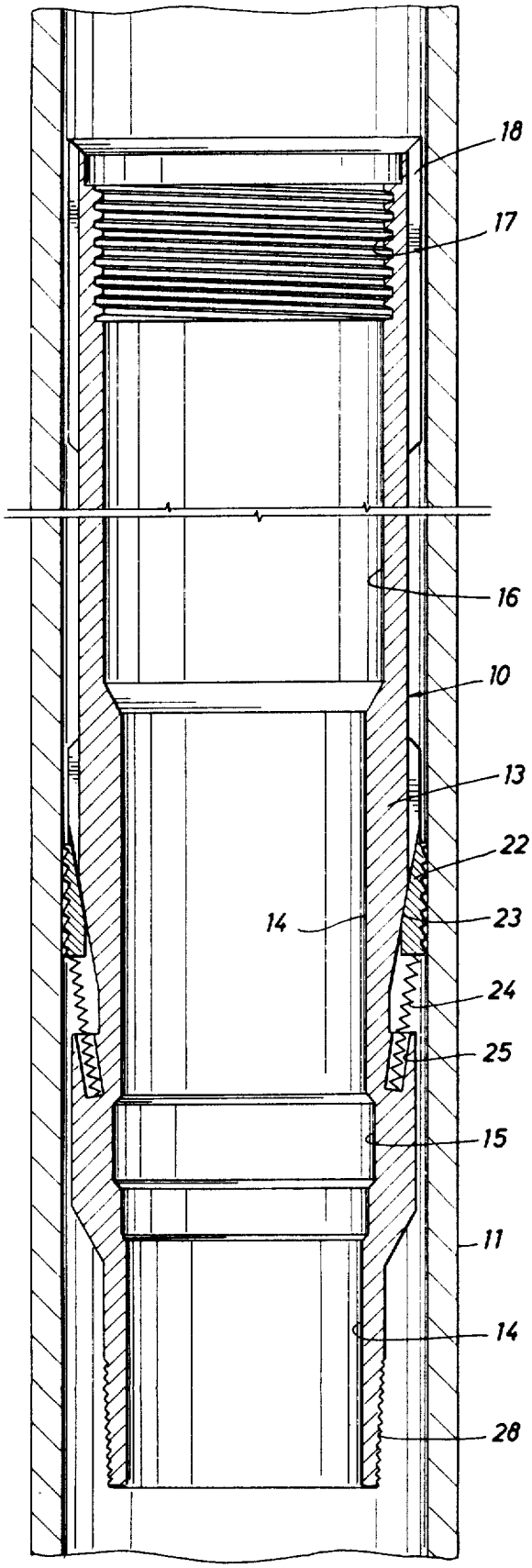
FIG. 6
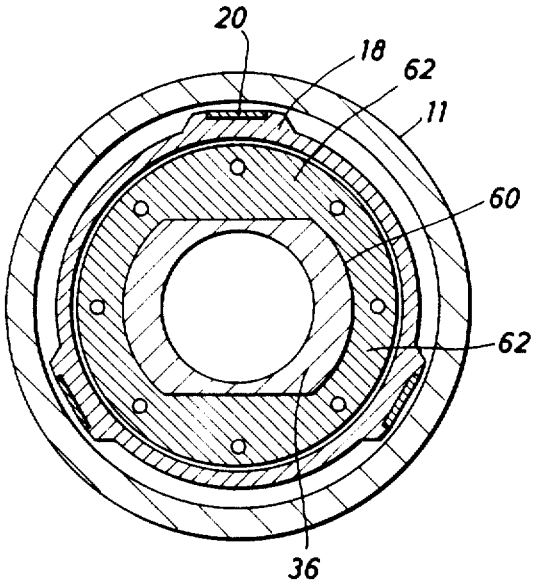
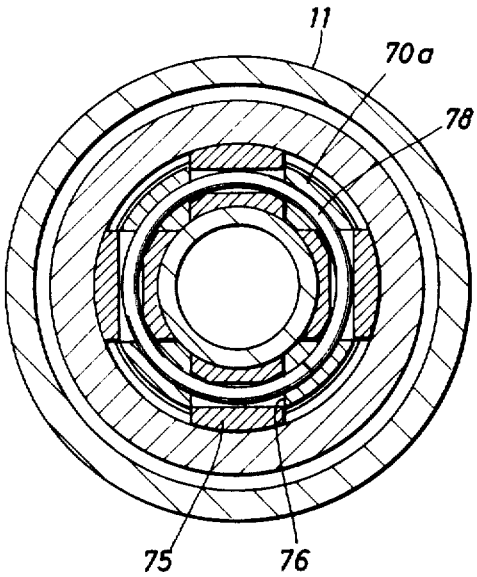
FIG. 7

SETTING TOOLS AND LINER HANGER ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to a new and improved hydraulic operated setting tool and liner hanger for securing a liner pipe string in a well bore preparatory to cementing the liner pipe string in place.

In the drilling or completion of wells, it is a common operation to set one or more liner hangers in a well. The liner hangers are attached to the upper end of a string of pipe and, when in position in a well, are set or anchored by mechanically or hydraulically operated mechanisms. A hydraulic, pressure set liner hanger has certain advantages in that it does not require mechanical movements of pipe and is, more of less, a positively set tool. In any hydraulically set mechanism for a liner hanger, it is, of course, desirable to reduce the possibility of fluid leaks in the liner hanger.

The present invention involves a hydraulically actuated setting tool and liner hanger which minimize the possibility of a malfunction or wrongful operation of the tool by only requiring one pressure operation for setting the liner hanger, and one operation for release of the setting tool from the liner hanger. The liner hanger is an integral member without ports and without special pressure sealing surfaces for the setting tool. All of the hydraulic pressure ports are in the setting tool so that the liner hanger is reduced to simply a body and slips. Since the entire setting tool can be retrieved, it is economical to recover the setting tool and service it. Also the setting tool and liner hanger are adaptable to reworking operations because the liner hanger has no specially ground surfaces.

SUMMARY OF THE INVENTION

In accordance with a preferred embodiment of the present [information] *invention*, a liner hanger is provided with spring biased slips and is connected to a hydraulic setting tool by a threaded release nut connection. The setting tool has a retrievable pack-off bushing which seals off the bore of the liner hanger from passage of fluid. A pressure operated sleeve on the setting tool body is shear pinned to the body and normally holds the slip elements in a retracted position. When pressure is applied to the sleeve, the sleeve is moved upon shearing of the shear pins to release the slip elements so they may be set in the pipe. Rotation of the mandrel of the tool releases the release nut connection so that the tool mandrel can be moved upwardly. Upward movement of the tool mandrel [releases] *retrieves* the pack-off bushing from the liner bore and the entire setting tool assembly is retrieved.

In another embodiment of the invention, a single spiral slip element is used as an anchoring mechanism. To set the spiral slip element, the pressure operated sleeve is actuated to mechanically set the slip element upon movement in an upward direction.

It is accordingly an object of the present invention to provide a new and improved hydraulic pressure set tool and liner hanger which will be operative under a wide range of operating conditions without having malfunctions.

Other objects and advantages of the present invention will become more readily apparent from the following detailed description which when read in conjunction with the accompanying drawings illustrate the invention, and wherein in the drawings:

BRIEF DESCRIPTION OF THE DRAWINGS

FIG. 5 illustrates, in longitudinal cross section, a liner hanger in a set position in a casing;

FIG. 6 illustrates, in a horizontal cross section, the apparatus when taken along line 6—6 of FIG. 1A.

FIG. 7 illustrates, in horizontal cross section, the apparatus when taken along line 7—7 of FIG. 1B;

DESCRIPTION OF THE INVENTION

Figure 1A:
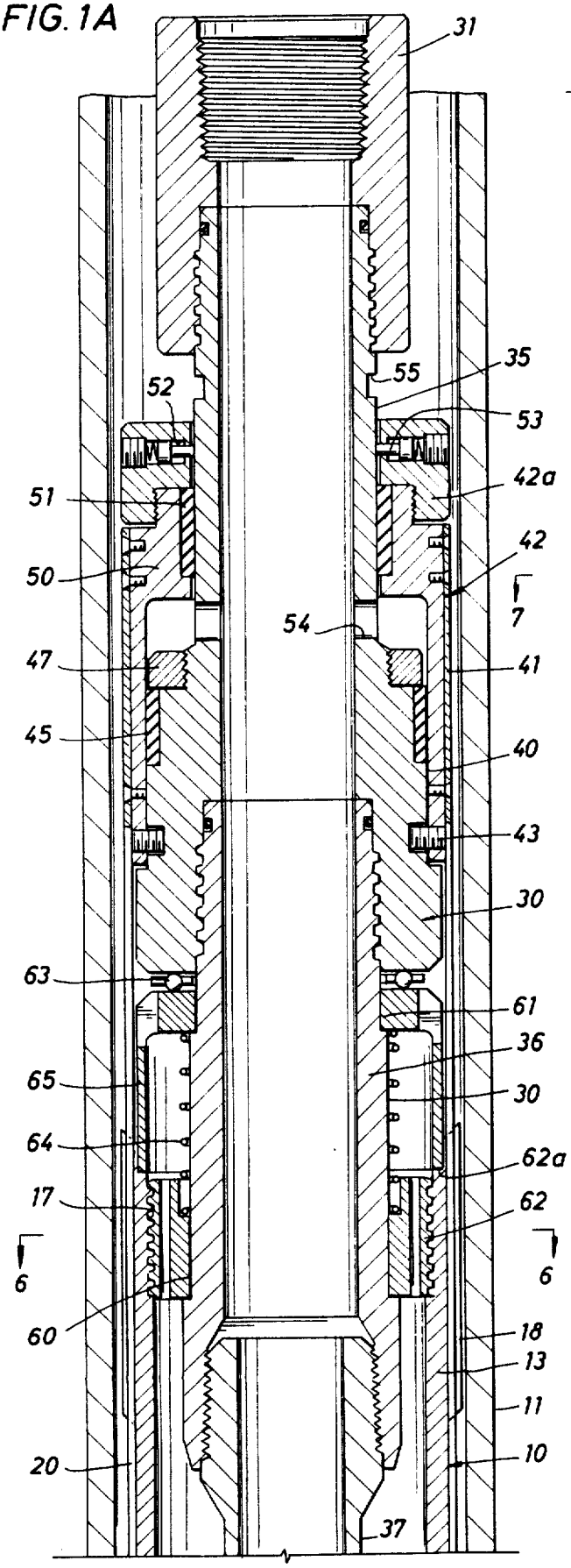
FIGS. 1A and 1B conjunctively illustrate, in longitudinal cross section, the setting tool and liner hanger of the present invention in a "going in" position in a well casing.

Referring now to the drawings where common numerals indicate common elements, the liner hanger 10 is shown in FIG. 5 in a "set" position in tubular casing or pipe 11. The liner hanger 10 includes a tubular hanger body 13 which has a center bore 14. The center bore 14 has an annular locking recess 15 disposed intermediate of the length of the bore 14. The locking recess 15 is formed from a section of enlarged diameter. At the upper end of the center bore 14 is an enlarged diameter portion 16 which terminates at its upper end with a threaded portion 17. On the outside, upper end of the hanger body 13, are three, angularly spaced longitudinal pads 18 (see FIG. 6) which respectively have longitudinal grooves therein for guiding elongated slip retaining members 20, as will hereinafter be more fully explained. Intermediate of the length of the outer surface of the hanger body 13 are three, circumferentially spaced slip members 22. The slips or slip members 22 are connected by common tapered, dovetail connections to cone or tapered surfaces 23 on the hanger body 13. The slips 22 are shown in an extended position is FIG. 5 with outer serrated surfaces in engagement with the casing 11. The slips 22 are resiliently biased in their extended position by spring members 24 which are disposed in cylindrical recesses 25. The springs 24 are arranged in compression so that when the slips are released, the springs normally urge the slip members 22 into gripping engagement with the wall of a casing 11. At the lower end of the liner hanger body 13 is a threaded connection 28 which is adapted for connection to the upper end of a liner pipe.

Figure 1B:
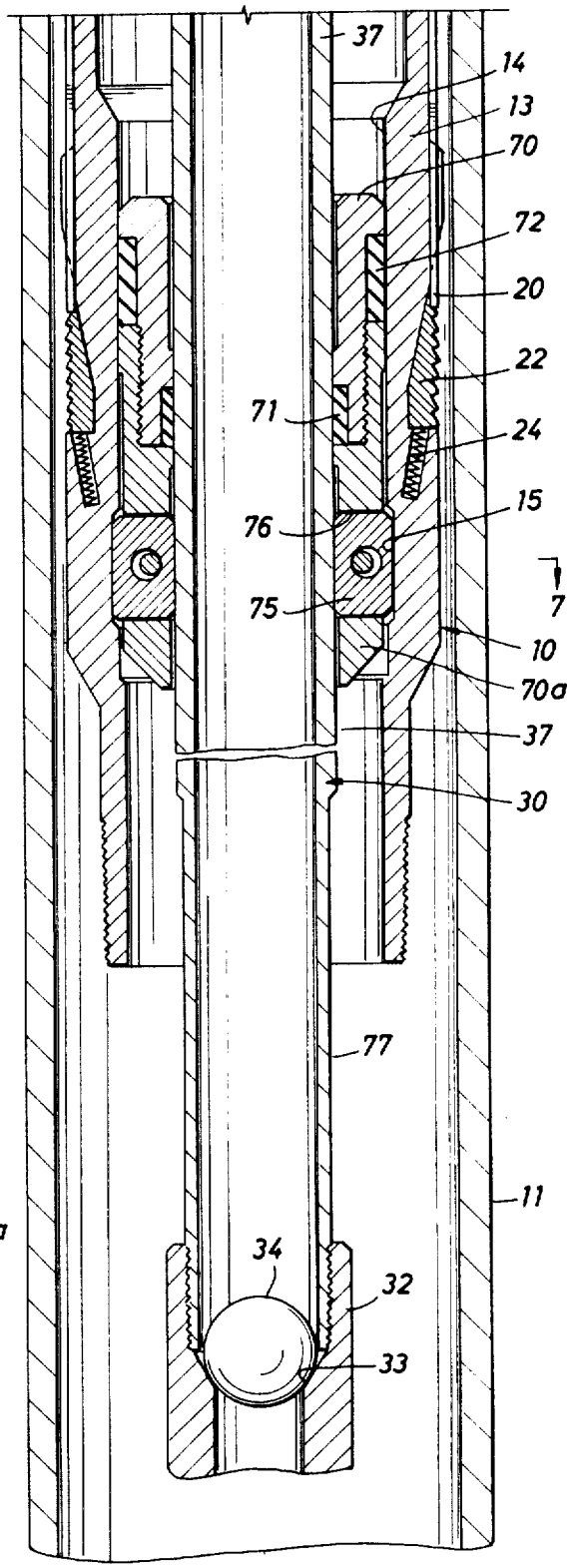

To set the liner hanger body 13 in position in a [wall] *well* casing 11 as shown in FIG. 5, a hydraulic setting tool is provided. The setting tool of the present invention includes a tubular mandrel 30 comprised of an upper section 35, an intermediate section 36 and a lower section 37 (FIGS. 1A and 1B). The upper section 35 has a tubular coupling sub 31 at its upper end. The mandrel 30 is adapted, at its lower section 37 for threaded coupling by means of a coupling sub 32 to a section of tubing (not shown). For purposes of explanation, the sub 32 is illustrated with an internal shoulder 33 to catch a solid sealing ball 34. In actual practice, the ball 34 is seated on a shoulder in a ball catcher (not shown) which is attached to the tubing (not shown). The purpose of the ball 34 seating on the shoulder 33 is to permit fluid pressure to be applied to the interior of the tubular assembly above the sealing ball.

The upper section 35 has an enlarged outer portion which has stepped diameter portions. On the first diameter stepped portion 40 is a tubular sleeve 41 of a pressure cylinder 42. Shear pins or shear screws 43 provide a releasable connection between the pressure cylinder 42 and the stepped portion 40. On the next intermediate stepped portion is a packing element 45 which provides a pressure seal between the sleeve 41 and the stepped portion 40. A stop-nut 47 is threadedly received on the section 35 for retaining the packing element 45 in a fixed position. The tubular sleeve 41 has a portion 50 of reduced diameter which is slidably received on the outer wall of the upper mandrel section 35. The reduced portion 50 has a packing element 51 disposed in sealing relationship with respect to the outer wall of the mandrel section 35.

A housing 42a is threadedly attached to the pressure cylinder 42. In the housing 42a is a plunger recess 52, which has a spring biased pin member 53 arranged to resiliently bear against the outer wall of section 35. Between the packing elements, 45 and 51, the upper mandrel section 35 has a pressure port 54 through a wall which is adapted to pass fluid from the interior of the section 35 to the interior of the cylinder 42 to act upon the pressure cylinder 42 and to move the cylinder 42 in an upward direction upon the application of sufficient pressure to shear the pins 43. Just below the coupling sub 31, the upper section 35 has an annular latching groove 55 which is adapted to receive the latch-pin member 53 when the cylinder is in an upper position on the section 35 and to lock the pressure cylinder 42 in an upper position.

The intermediate section 36 of the mandrel has stepped diameter portions 60 and 61. The first reduced portion 60 carries a setting tool release nut 62. The release nut (see FIG. 6) has interior flattened surface portions which match outer flat surfaces on the mandrel section 36 so that the mandrel section 36 can slide longitudinally with respect to the nut 62 yet impart rotational torque to the nut 62. The upper portion of diameter portion 61 is cylindrical shaped and is adapted to rotatably receive the upper end of a nut housing 65. The nut housing 65 is separated with respect to the upper section by a rotative bearing member 63. A spring 64 is disposed between the nut housing and the setting tool nut. The setting tool nut 62 is threadedly attached to the threaded portion 17 of the liner hanger body 13. The tubular end 62a of the nut housing 65 abuts an internal shoulder disposed in the upper end of the liner hanger body 13. The interior of the nut housing 65 is sized to receive the nut 62 when it is moved upwardly relatively to the mandrel section 36.

On the lower mandrel section 37, a packoff bushing member 70 is disposed between the mandrel section 37 and the liner hanger body 13 (See FIG. 1B). The packoff bushing member 70 has inner and outer annular sealing members 71, 72 for sealing engagement with the outer wall of the mandrel section 37 and the inner bore 14 of the liner hanger body 13. In addition, the bushing member 70 has an attached latch housing 70a with four circumferentially spaced, latch members 75 (see FIG. 7) received in slots 76 in the latch housing 70a. The latch members 75 normally are received in the annular recess 15 in the body member 13 (see FIG. 1B) and extend between the outer wall of the mandrel section 39 and into the recess 15 so that the bushing member 70 is effectively locked in position with the liner hanger body 13. Below the lower mandrel section 37 is an outer, recessed annular portion 77 which is used to release and allow the latches 75 to retract from the recess 15 in the body member 13. The latches 75 are held in place by ring member 78.

The pressure cylinder 42 has attached elongated vertical strap members 20 which extend along the outside of the nut housing and through vertical guide grooves 18 on the liner hanger body (see FIG. 6). In the position of the tool as illustrated in FIGS. 1A and 1B, the lowermost ends of the straps 20 engage the uppermost ends of the slip members 22. The slip members 22, when so engaged by the strap members 20 are held in a retracted position on the tool body and the springs 24 behind the slip members are normally compressed.

Figure 9:
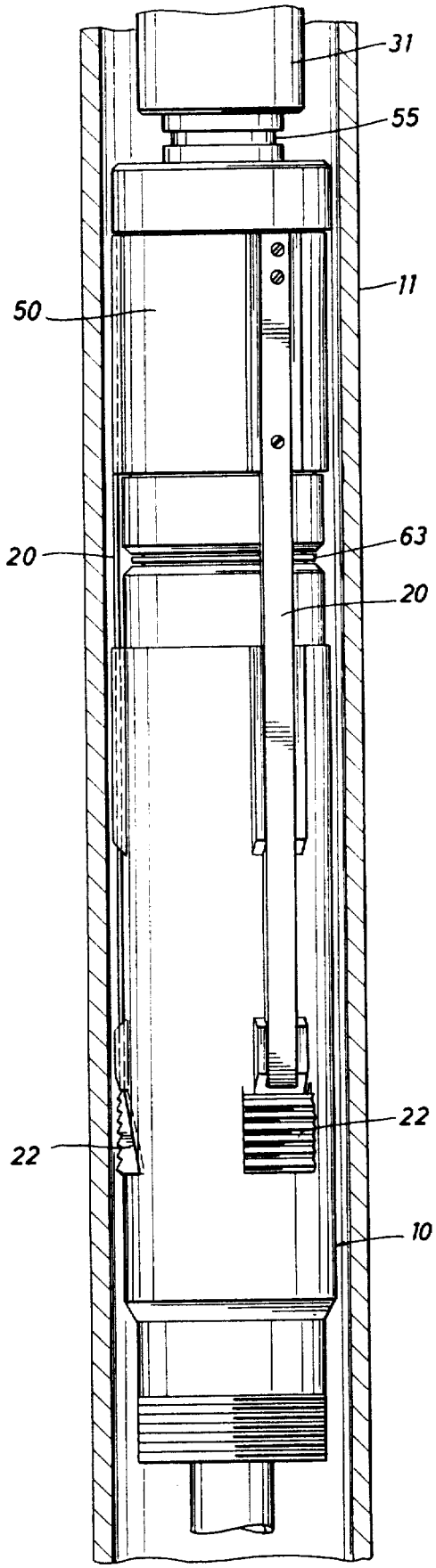
FIG. 9 illustrates an outer view of the tool in a "going in" position of the apparatus.
Figure 8:
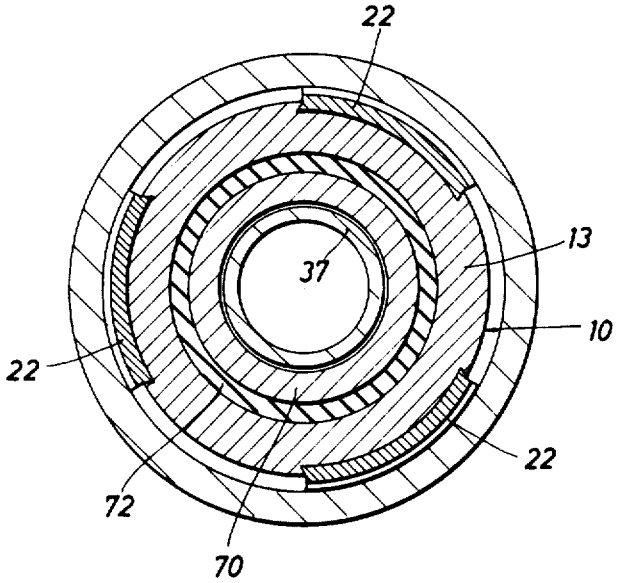
FIG. 8 is a view in horizontal cross section taken a long line 8—8 of FIG. 2B.

As illustrated in FIGS. 1A, 1B, and FIG. 9, the tool can be run into the well bore through the casing 11 to a position where it is desired to set the liner hanger 10. The interior bore of the liner hanger is closed off by the pack-off bushing 70.

Figure 2A:
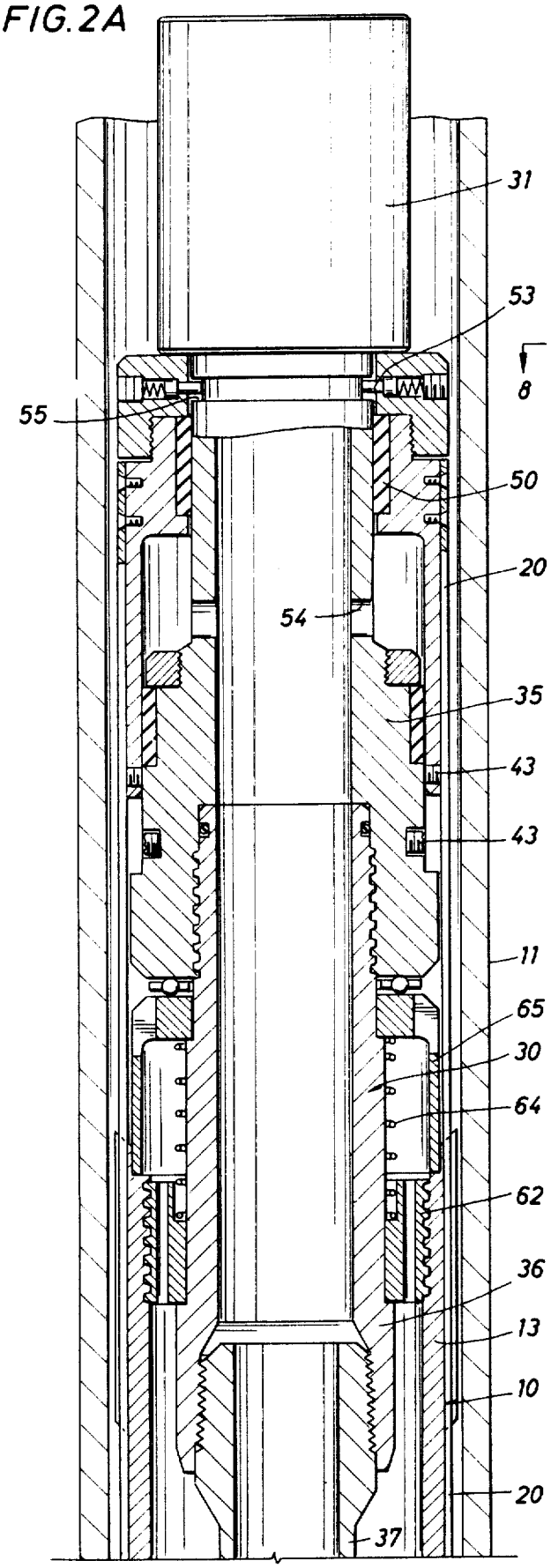
FIGS. 2A and 2B conjunctively illustrate in longitudinal cross section, the setting tool and liner hanger after pressure has been applied to the tool.
Figure 2B:
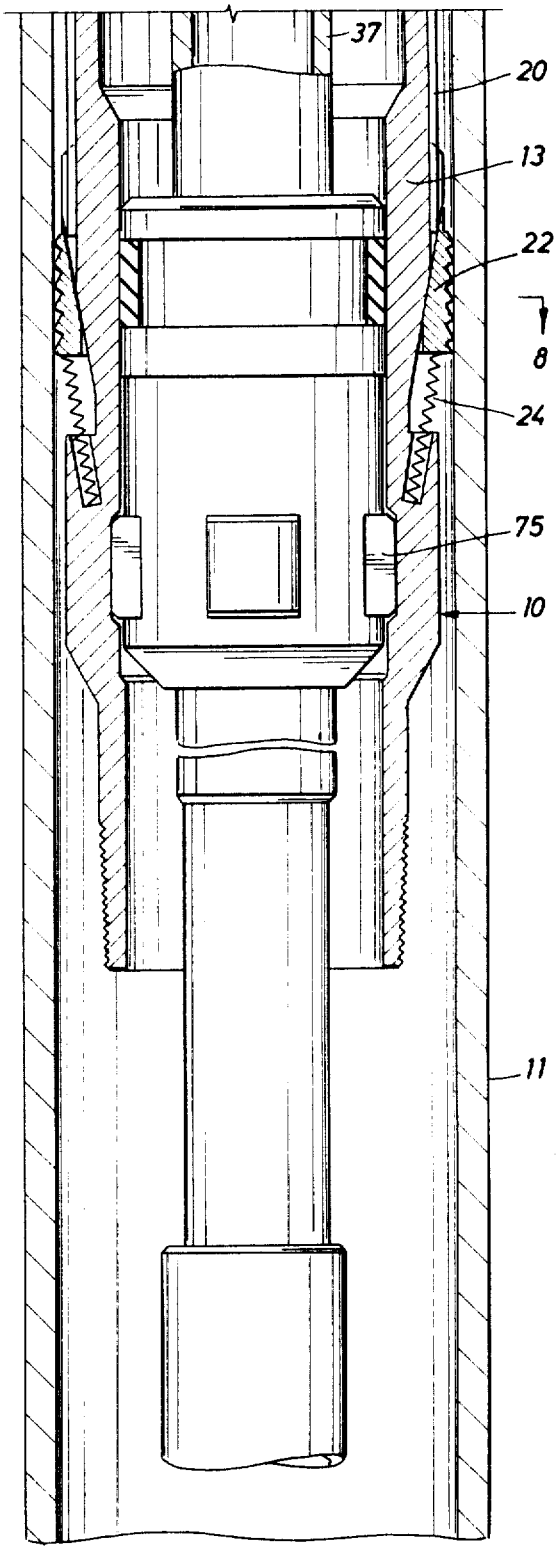

As shown in FIGS. 2A and 2B, when it is desired to set the liner hanger 10, a pressure ball 34 (see FIG. 1B for illustration of position) is dropped through the tubing string and to close off the bore of the pipe below the pressure ports 54 in the upper mandrel. With the bore of the mandrel and tubing string above the ball being pressure sealed or closed, when fluid pressure is applied to the interior of the tubing string it acts through the pressure ports 54 upon the pressure cylinder 42. The pressure on the pressure cylinder 42 causes the shear pins 43 to be fractured and the pressure cylinder 42 moves upwardly until it abuts or engages the coupling 31, (see FIG. 2A and 2B). In the upper position of the pressure cylinder 42, the latch pin 53 engages the locking groove 55 and locks the pressure cylinder 42 in its uppermost position. Movement of the pressure cylinder 42 in an upward direction relative to the mandrel section 30 causes the straps 20 to be raised upwardly *and separated from the slip members 22* thereby releasing the slip members 22 from their retracted position so that the springs 24 can force the slip members 22 outwardly into engagement with the wall of the casing 11. Force can then be applied in a downward direction through the coupling sub 31, the mandrel section 35, the bearing 63, the nut housing 65 and the body member 13 to set the slips firmly in position within the pipe.

Figure 3A:
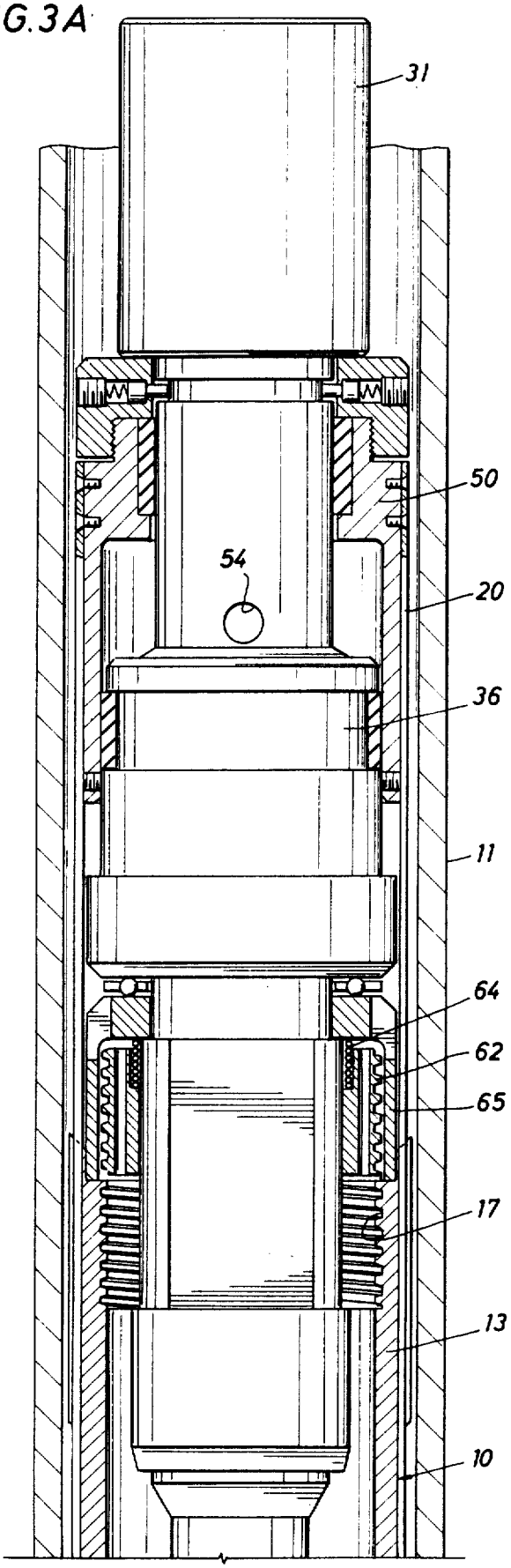
FIGS. 3A and 3B conjunctively illustrate in longitudinal cross section, the position of elements of the setting tool and liner hanger after operation of the release mechanism and release of the setting tool from the liner hanger.
Figure 3B:
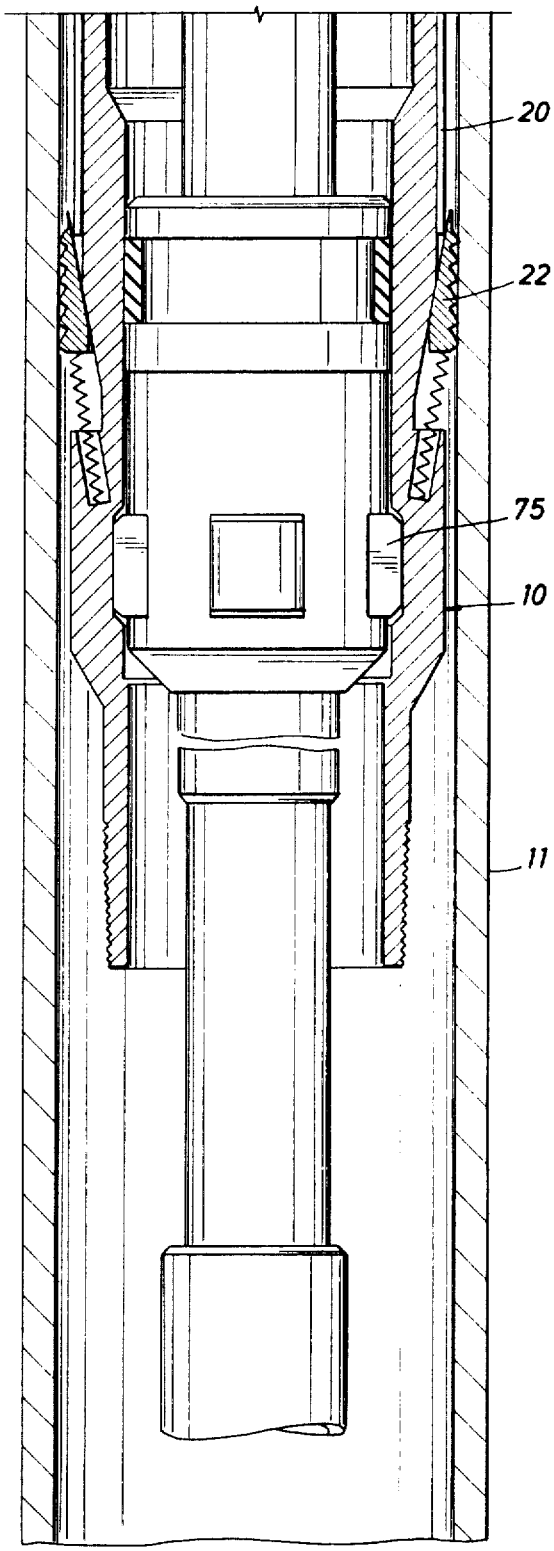

To retrieve the setting tool, the tubing attached to the coupling 31 is rotated in a clockwise direction which causes the setting nut 62 to rotate out of its threaded position with respect to the liner hanger body 13 against the force of the spring 64 and to ride up into the recess within the nut housing 65 (see FIG. 3A). When the nut 62 clears the threaded connection 17 on the liner hanger body 13, the setting tool has been operatively disconnected from the liner hanger 10 and the tubing can be raised in an upward direction.

Figure 4A:
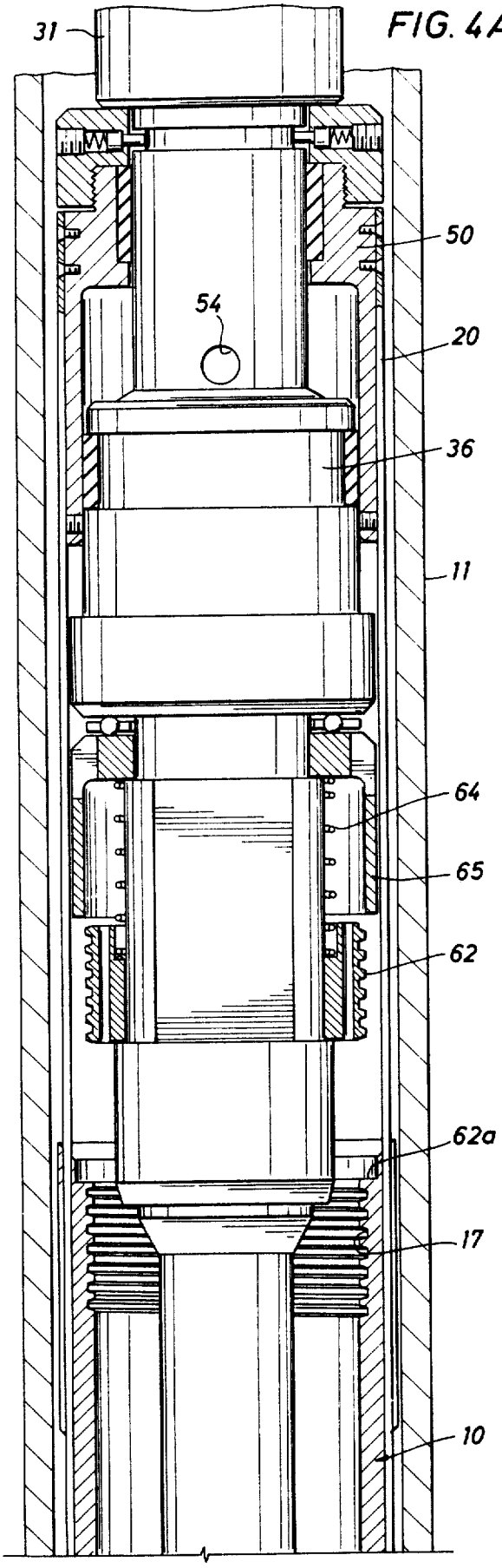
FIGS. 4A and 4B conjunctively illustrate in longitudinal cross section, the position of the setting tool in an elevated position with respect to the liner hanger to illustrate the release of the latching mechanism.
Figure 4B:
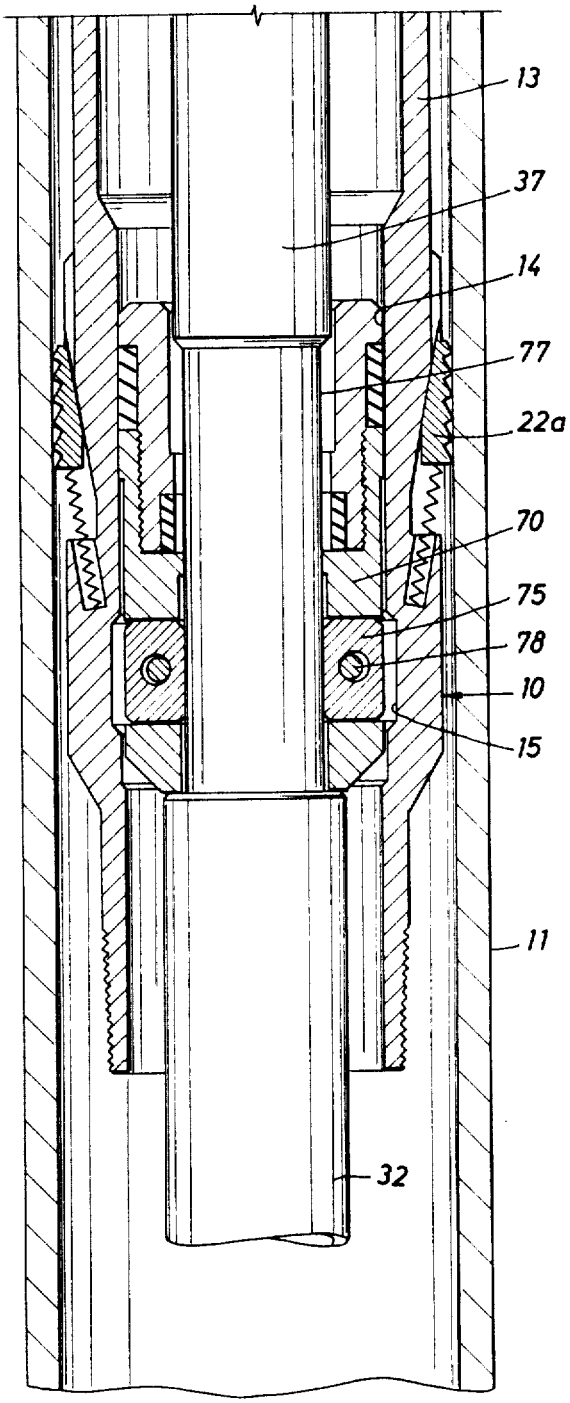

When the tubing and coupling 31 are raised in an upward direction, as shown in FIGS. 4A and 4B, the lower mandrel section 37 also is raised until the coupling 32 contacts lower bushing member 70a and the reduced diameter portion 77 is positioned adjacent to the latch members 75. Continued upward movement forces latching members 75 from the annular recess 15 and into their slotted cavity within the lower bushing section 70a. This action releases the bushing housing 70 with respect from the liner hanger body 13 and permits retrieval of the entire setting tool.

Figure 10A:
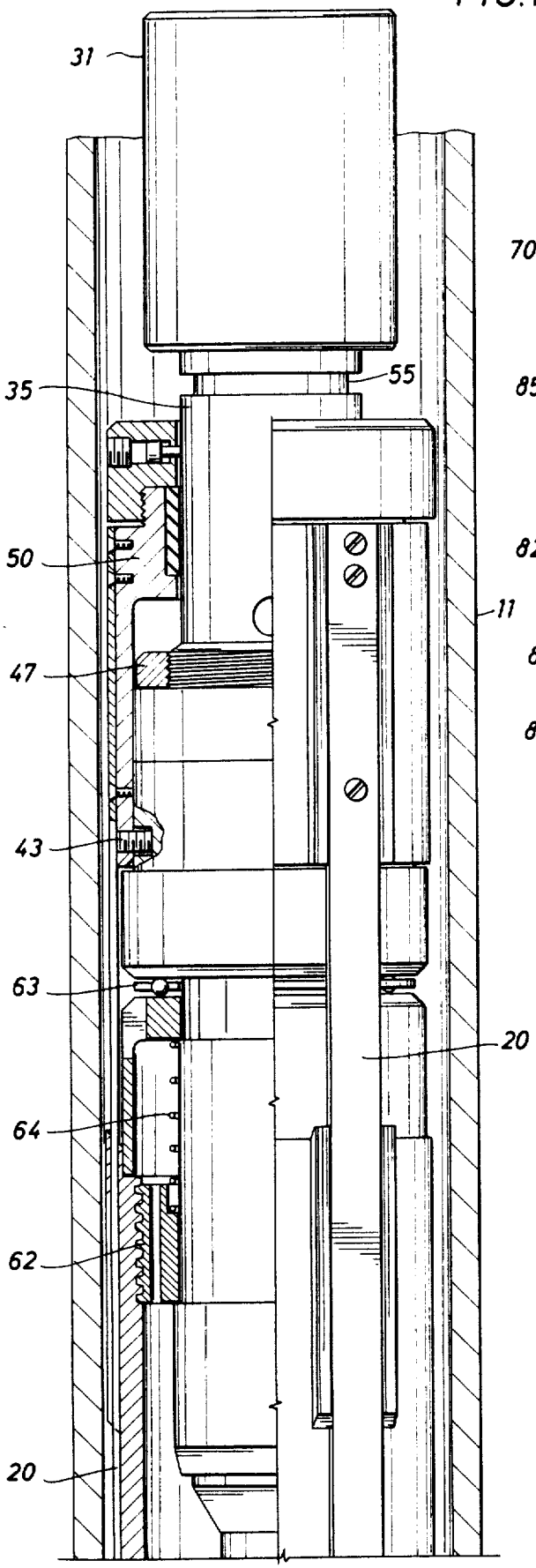
FIGS. 10A and 10B are conjunctive views, in longitudinal cross section, through a tool which represent another embodiment of the present invention. On the vertical right-hand side of FIGS. 10A and 10B, the outer configuration of the tool is illustrated and, on the vertical left-hand side from the center line, the cross section of the tool is illustrated.
Figure 10B:
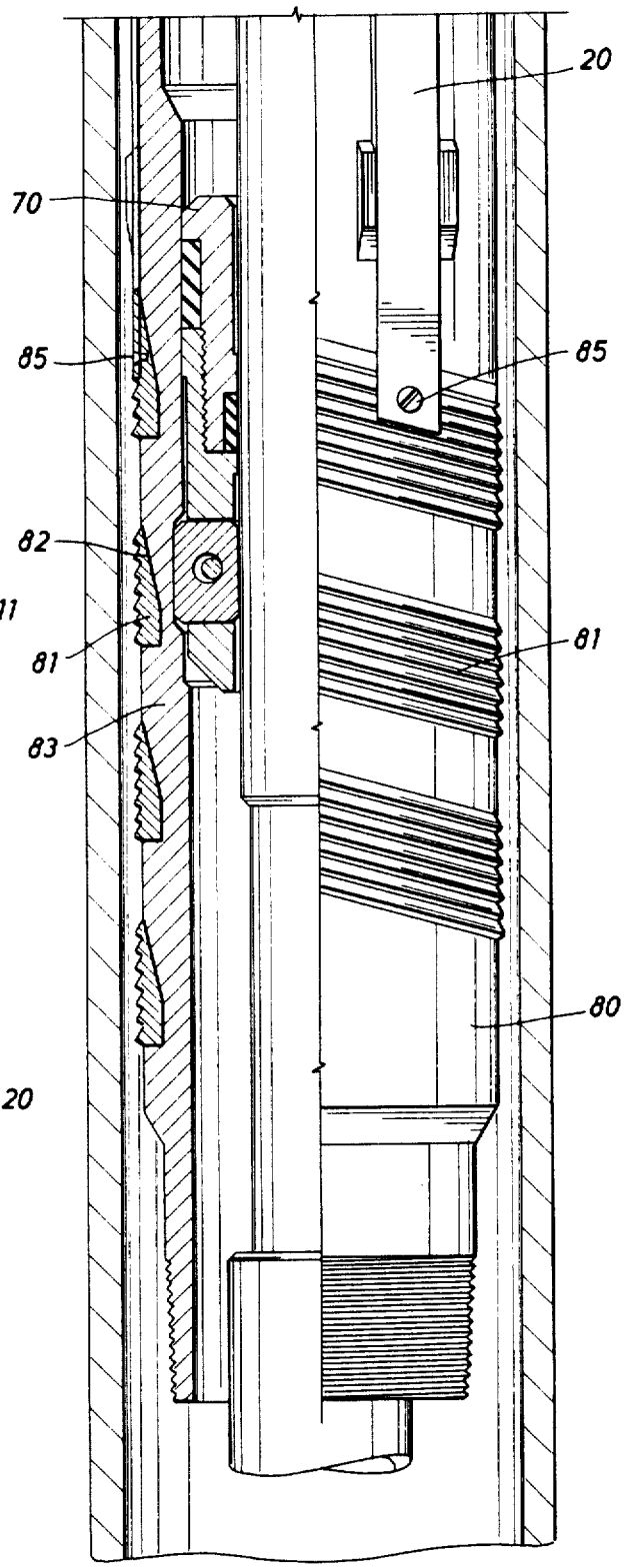

In FIGS. 10A and 10B, another embodiment of the present invention is illustrated which utilizes a liner hanger 80 having a single spiral slip element 81 arranged on a spiral cam groove 82 in the liner hanger body 83. Remaining components of the tool and hanger which are similar to the hanger and tool as heretofor described and are identified with similar members.

The vertical straps 20 are attached to the slip element 81 by a shear pins 85 so that upon the movement of the pressure cylinder 50 toward its upward position, the straps 20 carry the slip element 81 upwardly into engagement with the wall of the casing and thereafter shear the pins 85 to release the straps 20 from the slip element 81. Further construction details of the spiral slip element and cam groove are disclosed in my copending application Ser. No. 079,037 filed Sept. 26, 1979 and entitled "Liner Hanger Assembly".

While only selected embodiments of the present invention are illustrated and described herein, other embodiments of the invention are contemplated and many changes and modifications of the inventions may be made within the scope of the appended claims without departing from the spirit of the invention.

I claim:

1. A liner hanger and setting tool for use in a well bore comprising:

a liner hanger body member having slip means disposed about its outer circumference, said slip means being movable between a retracted condition and an extended condition in which the slip means engage a well bore, said body member having its lower end adapted for connection to a tubular string of pipe;

a setting tool including tubular means extending through said body member said tubular means at its upper end having a hydraulically operated pressure means, said pressure means in one operative position being releasably coupled to said slip means to normally retain said slip means in a retracted condition and in another operative position being released from said slip means, permitting said slip means to be in an extended condition,

*spring means normally biasing said slip means toward said extended condition and for independently moving said slip means between said retracted condition and said extended condition;* said tubular means intermediate of its length having a releasable rotative connection with said body member which is operative to release said tubular means from said body member upon relative rotation therebetween, said tubular means at its lower end having pack-off means, *means for* releasably [interconnected] *interconnecting said pack-off means* with said body member and operative to be released from interconnection with said body member upon relative longitudinal movement between said tubular means and said body member.

2. The liner hanger and setting tool as defined in claim 1 wherein said body is an integral part without ports.

[3. The liner hanger and setting tool as defined in claim 2 wherein said body member has spring biased slip members normally biased to an extended position.]

[4. The liner hanger and setting tool as defined in claim 2 wherein said slip means includes a spiral slip element.]

5. The liner hanger and setting tool as defined in claim 2 wherein said pack-off means includes a sleeve member carrying inner and outer sealing means and latch members, said latch members being movable in a horizontal plane into and out of engagement with a latch groove in the body member, and means on said tubular means for controlling the position of said latch members.

6. A liner hanger and setting tool for use in a well bore comprising:

a liner hanger body member having slip means disposed about its outer circumference, said slip means being movable between a retracted condition and an extended condition in which the slip means engage the well bore;

said body member having its lower end adapted for connection to a tubular string of pipe;

a setting tool including tubular means extending through said body member, hydraulic operated pressure means on the upper end of said body member, said pressure means including a pressure sleeve movable between upper and lower positions, and a port through the tubular means whereby pressure within the tubular means may be applied to said pressure sleeve for moving said pressure sleeve between said lower and upper positions; means for releasably retaining said pressure sleeve in one of said upper and lower positions and for locking said pressure sleeve in the other of said upper and lower positions, strap members attached to said pressure sleeve and extending longitudinally along the outer surface of said body member to engage the slip means and retain said slip means in a retracted condition when said pressure sleeve is in one position and to release said slip means for assuming an extended condition when said pressure sleeve is in its other position, said tubular means having a nut member threadedly coupled to said body member, said nut member being adapted, upon rotation of said tubular means, to release said tubular means from said body member;

*spring means normally biasing said slip means toward said extended condition and for independently moving said slip means between said retracted condition and said extended condition;* said tubular means at its lower end having pack-off means releasably [inteconnected] *interconnected* with said body member, said pack-off means including a sleeve member on said tubular means having sealing means for sealing off the tubular means with respect to the body member, latch means on said sleeve member for engaging a locking recess in said body member, said tubular means having a recessed section whereby, upon longitudinal relative movement, the recessed section can be positioned adjacent to said latch means for effective release of said pack-off means from said body members.

7. A setting tool for use with a liner hanger in a well bore comprising a tubular mandrel adopted for coupling between a string of tubular members, a pressure operated sleeve slidably disposed on the upper end of said tubular mandrel, shear means for releasably retaining said sleeve in one position on said tubular mandrel, port means in said tubular mandrel for providing fluid pressure access to said sleeve, spring biased locking means in said sleeve adapted for cooperation with an annular locking groove in said tubular mandrel in another position of said sleeve on said tubular mandrel, a nut member slidably mounted on said tubular mandrel, said nut member having an external threaded portion for interconnection with a threaded portion of a liner hanger, a nut housing rotatably mounted on said tubular mandrel above said nut member and having a hollow interior adopted to receive said nut member and having a lower end adopted to engage a liner hanger, spring means disposed in said nut housing for applying a compression force on said nut member, and a tubular seal member slidably mounted on the lower end of said tubular mandrel, said seal member having pack-off means and spring biased latch members, said latch members normally extending outwardly of the seal member, said tubular mandrel havng a recessed portion permitting said latch members to retract relative to said seal member when said recessed portion is disposed adjacent to said latch members.

8. A liner hanger and setting tool for use in a well bore comprising:

a liner hanger body member having slip means disposed about its outer circumference, said slip means being movable between a retracted condition and an extended condition whereby the slip means engage a well bore, said body member having its lower end adapted for connection to a tubular string of pipe;

a setting tool including tubular means extending through said body member;

said tubular means at its upper end having a hydraulically operated pressure means, said pressure means having a portion thereof movable in response to hydraulic pressure between a first longitudinal position holding said slip means in a retracted condition and a second longitudinal position releasing said slip means,

*spring means normally biasing said slip means toward said extended condition and for independently moving said slip means between said retracted condition and said extended condition,* said tubular means intermediate of its length having an outer, rotative connection with an internal bore of said body member, said rotative connection being operative to release said tubular means from said body member upon relative rotation therebetween thereby to permit relative longitudinal movement therebetween; and pack-off means releasably interconnected with said body member and sealing the bore of said body member, said pack-off means having an internal bore slidably and sealingly receiving said tubular means, said tubular means below said pack-off means having release means operative to release said pack-off means from interconnection with said body member upon relative longitudinal movement of said tubular means sufficient to cause said release means to release said pack-off means.

9. A liner hanger for use in hanging tubular liners a well bore comprising;

an elongated tubular body member having (i) an internally threaded portion at its upper end for releasably coupling to a setting tool, (ii) an external threaded portion at its lower end for coupling to a tubular liner, (iii) an integral monolithic solid wall surface between said upper and lower ends, (iv) a longitudinally extending internal sealing bore portion between said upper and lower ends, said bore portion having a polished portion for slidably and sealingly receiving a tubing string having a sealing member for establishing a sealing relationship within said polishing bore portion;

(v) an internal recessed portion below said sealing bore portion, said recessed portion being sized and adapted for receiving locking means, [and]

(vi) externally located slip means for engaging the wall of a pipe and preventing downward movement of said body member in a pipe171 .], *and*

*(vii) spring means normally biasing said slip means toward an extended position and for independently moving said slip means from a retracted position to an extended condition in engagement with the wall of a pipe.*

[10. The liner hanger as set forth in claim 9 wherein said slip means include circumferentially spaced slip elements, and means for resiliently urging said slip elements from a retracted position toward an extended position.]

11. A liner hanger for use in hanging tubular liners in a well bore comprising:

(i) an internally threaded portion at its upper end for releasably coupling to a setting tool, (ii) an external threaded portion at its lower end for coupling to a tubular liner, (iii) an integral solid wall surface between said upper and lower ends, (iv) a longitudinally extending internal sealing bore portion between said upper and lower ends, said bore portion being adapted to sealingly receive a sealing member, (v) an internal recessed portion below said sealing bore portion, said recessed portion being sized and adapted for receiving locking means, and (vi) externally located slip means for engaging the wall of a pipe and preventing downward movement of said body member in a pipe, said slip means include a spiral slip element disposed about the circumference of the body member, said body member having a spiral camming surface complementarily cooperating with said slip element.

12. The liner hanger as set forth in claim 11 wherein said outer surface of said body member has vertical guiding grooves disposed in vertical alignment with said slip elements.

*13. A liner hanger and setting tool for use in a well bore comprising:*

*a liner hanger body member having slip means disposed about its outer circumference, said slip means being movable between a retracted condition and an extended condition in which the slip means engage a well bore, said body member having its lower end adapted for connection to a tubular string of pipe;*

*spring means normally biasing said slip means toward said extended condition and for independently moving said slip means between said retracted condition and said extended condition;*

*a setting tool including tubular means extending through said body member;*

*said tubular means at its upper end having a hydraulically operated pressure means, said pressure means in one operative position engaging said slip means to normally retain said slip means in a retracted condition and in another operative position being separated from said slip means, permitting said slip means to be in an extended condition;*

*said tubular means intermediate of its length having a releasable rotative connection with said body member which is operative to release said tubular means from said body member upon relative rotation therebetween;*

*said tubular means at its lower end having pack-off means for sealing off said tubular means with respect to said body member.*

*14. A liner hanger and setting tool for use in a well bore comprising:*

*a liner hanger body member having slip means disposed about its outer circumference, said slip means being movable between a retracted condition and an extended condition in which the slip means engage a well bore, said body member having its lower end adapted for connection to a tubular string of pipe;*

*a setting tool including tubular means extending through said body member;*

*said tubular means at its upper end having a hydraulically operated pressure means, said pressure means in one operative position being releasably coupled to said slip means to normally retain said slip means in a retracted condition and in another operative position being released from said slip means, permitting said slip means to be in an extended condition;*

*spring means normally biasing said slip means toward said extended condition and for independently moving said slip means between said retracted condition and said extended condition;*

*said tubular means intermediate of its length having a releasable rotative connection with said body member which is operative to release said tubular means from said body member upon relative rotation therebetween;*

*said tubular means at its lower end having pack-off means; and*

*means for connecting said pack-off means with said tubular means so that said pack-off means are operative to be removed from said body member upon relative longitudinal movement between said tubular means and said body member after release of said tubular means from said body member.*

*15. A liner hanger and setting tool for use in a well bore comprising:*

*a liner hanger body member having slip means disposed about its outer circumference, said slip means being movable between a retracted condition and an extended condition in which the slip means engage a well bore, said body member having its lower end adapted for connection to a tubular string of pipe;*

*spring means normally biasing said slip means toward said extended condition and for independently moving said slip means between said retracted condition and said extended condition;*

*a setting tool including tubular means extending through said body member;*

*said tubular means at its upper end having a hydraulically operated pressure means, said pressure means in one operative position engaging said slip means to normally retain said slip means in a retracted condition and in another operative position being separated from said slip means, permitting said slip means to be in an extended condition;*

*said tubular means intermediate of its length having a releasable rotative connection with said body member which is operative to release said tubular means from said body member upon relative rotation therebetween to permit retrieval of said tubular means; and*

*said tubular means at its lower end having pack-off means for sealing off said tubular means with respect to said body member, said pack-off means being attached to said tubular means whereby said pack-off means are retrievable with said tubular means.*

* * * * *